(12) United States Patent
Crawford

(10) Patent No.: US 9,804,754 B2
(45) Date of Patent: Oct. 31, 2017

(54) METHOD AND SYSTEM FOR PROVIDING SEGMENT-BASED VIEWING OF RECORDED SESSIONS

(71) Applicant: Terry Crawford, Atlanta, GA (US)

(72) Inventor: Terry Crawford, Atlanta, GA (US)

(*) Notice: Subject to any disclaimer, the term of this patent is extended or adjusted under 35 U.S.C. 154(b) by 381 days.

(21) Appl. No.: 14/388,071

(22) PCT Filed: Mar. 28, 2013

(86) PCT No.: PCT/US2013/034390
§ 371 (c)(1),
(2) Date: Sep. 25, 2014

(87) PCT Pub. No.: WO2013/149027
PCT Pub. Date: Oct. 3, 2013

(65) Prior Publication Data
US 2015/0052437 A1     Feb. 19, 2015

Related U.S. Application Data

(60) Provisional application No. 61/616,702, filed on Mar. 28, 2012.

(51) Int. Cl.
*G09B 19/00*     (2006.01)
*G06F 3/0484*    (2013.01)
(Continued)

(52) U.S. Cl.
CPC .... *G06F 3/04842* (2013.01); *G06F 17/30852* (2013.01); *G06Q 10/1053* (2013.01);
(Continued)

(58) Field of Classification Search
CPC .......... G06F 17/30849; G06F 17/3082; G06F 17/30867; G06F 3/04842; G06F 17/30852;
(Continued)

(56) References Cited

U.S. PATENT DOCUMENTS 4,316,224 A * 2/1982 Hansen ................ G11B 15/005
                                                    360/72.2
5,721,827 A * 2/1998 Logan ................ G06F 17/30746
                                                    709/217

(Continued)

FOREIGN PATENT DOCUMENTS

| CN | 1947421 A   | 4/2007  |
|----|-------------|---------|
| CN | 101894577 A | 11/2010 |
| CN | 102184212 A | 9/2011  |

OTHER PUBLICATIONS

International Search Report for corresponding International Application No. PCT/US2013/034390, dated Jun. 10, 2013, 2 pages.

(Continued)

*Primary Examiner* — Scott Baderman
*Assistant Examiner* — Hassan Mrabi
(74) *Attorney, Agent, or Firm* — Ditthavong & Steiner, P.C.

(57) ABSTRACT

An approach for providing segment-based viewing of recorded sessions is described. A video platform may determine one or more segments of a communication session based on content of the communication session. The video platform may also associate one or more segments with a recording of the communication session. The video platform may cause, at least in part, a presentation of the recording and one or more indicators for navigating playback of the recording based on the one or more segments, wherein the one or more indicators correspond to the one or more segments.

20 Claims, 11 Drawing Sheets

(51) Int. Cl.
| | |
|---|---|
| *G06F 17/30* | (2006.01) |
| *H04N 21/2543* | (2011.01) |
| *H04N 21/258* | (2011.01) |
| *H04N 21/2743* | (2011.01) |
| *H04N 21/472* | (2011.01) |
| *H04N 21/475* | (2011.01) |
| *H04N 21/845* | (2011.01) |
| *G11B 27/28* | (2006.01) |
| *G11B 27/34* | (2006.01) |
| *G06Q 10/10* | (2012.01) |

(52) U.S. Cl.
CPC ......... *G06Q 10/1093* (2013.01); *G11B 27/28* (2013.01); *G11B 27/34* (2013.01); *H04N 21/2543* (2013.01); *H04N 21/25866* (2013.01); *H04N 21/2743* (2013.01); *H04N 21/4756* (2013.01); *H04N 21/47214* (2013.01); *H04N 21/47217* (2013.01); *H04N 21/8456* (2013.01)

(58) Field of Classification Search
CPC ......... H04N 21/2543; H04N 21/25866; H04N 21/2743; H04N 21/47214; H04N 21/47217; H04N 21/4756; H04N 21/8456; G06Q 10/1053; G06Q 10/1093
USPC ....................................................... 715/720
See application file for complete search history.

(56) References Cited

U.S. PATENT DOCUMENTS

| | | | | |
|---|---|---|---|---|
| 5,732,216 A * | 3/1998 | Logan | ............... | H04H 60/46 704/201 |
| 6,199,076 B1 * | 3/2001 | Logan | ............... | G06F 17/30053 434/319 |
| 8,612,517 B1 * | 12/2013 | Yadid | ............... | H04N 21/25891 709/201 |
| 9,143,742 B1 * | 9/2015 | Amira | ............... | H04N 7/181 |
| 2002/0080286 A1 * | 6/2002 | Dagtas | ............... | G06F 17/30787 348/738 |
| 2003/0065655 A1 * | 4/2003 | Syeda-Mahmood | ......... | G06F 17/30017 |
| 2003/0093790 A1 * | 5/2003 | Logan | ............... | G06F 17/30265 725/38 |
| 2004/0021765 A1 * | 2/2004 | Kubala | ............... | H04N 7/15 348/14.08 |
| 2004/0152054 A1 * | 8/2004 | Gleissner | ............... | G09B 5/06 434/156 |
| 2004/0199495 A1 * | 10/2004 | Colbath | ............... | G10L 25/78 |
| 2004/0263636 A1 * | 12/2004 | Cutler | ............... | H04N 7/15 348/211.12 |
| 2004/0268398 A1 * | 12/2004 | Fano | ............... | G11B 27/105 725/88 |
| 2005/0010952 A1 * | 1/2005 | Gleissner | ............... | G09B 5/06 725/46 |
| 2005/0257240 A1 * | 11/2005 | Faulkner | ............... | G06F 17/30817 725/92 |
| 2006/0286527 A1 * | 12/2006 | Morel | ............... | G09B 19/06 434/307 R |
| 2007/0055695 A1 * | 3/2007 | Dorai | ............... | G06F 17/30796 |
| 2007/0106660 A1 * | 5/2007 | Stern | ............... | G06F 17/30796 |
| 2007/0106685 A1 * | 5/2007 | Houh | ............... | G06F 17/30796 |
| 2007/0106693 A1 * | 5/2007 | Houh | ............... | G06F 17/30247 |
| 2007/0112837 A1 * | 5/2007 | Houh | ............... | G06F 17/30247 |
| 2007/0118873 A1 * | 5/2007 | Houh | ............... | G06F 17/30746 725/136 |
| 2007/0277201 A1 * | 11/2007 | Wong | ............... | H04N 5/44543 725/40 |
| 2008/0215317 A1 * | 9/2008 | Fejzo | ............... | G10L 19/0017 704/217 |
| 2008/0276266 A1 * | 11/2008 | Huchital | ............... | G06Q 30/02 725/32 |
| 2009/0046139 A1 * | 2/2009 | Cutler | ............... | H04N 7/15 348/14.08 |
| 2009/0100454 A1 * | 4/2009 | Weber | ............... | G11B 27/28 725/9 |
| 2009/0198358 A1 * | 8/2009 | Logan | ............... | G06F 17/30053 700/94 |
| 2009/0306981 A1 * | 12/2009 | Cromack | ............... | G06F 17/30743 704/235 |
| 2010/0073561 A1 * | 3/2010 | Onikubo | ............... | H04N 5/4401 348/555 |
| 2010/0158470 A1 * | 6/2010 | Tzoukermann | ... | G06F 17/30038 386/241 |
| 2010/0287475 A1 * | 11/2010 | Van Zwol | ............... | G06F 3/04817 715/723 |
| 2011/0043652 A1 * | 2/2011 | King | ............... | G06F 17/2211 348/222.1 |
| 2011/0145161 A1 | 6/2011 | Scarborough et al. | | |
| 2011/0286584 A1 * | 11/2011 | Angel | ............... | G10L 15/26 379/88.02 |
| 2011/0287748 A1 * | 11/2011 | Angel | ............... | H04M 3/42221 455/414.1 |
| 2012/0084435 A1 * | 4/2012 | Vasa | ............... | G06F 17/30796 709/224 |
| 2013/0065208 A1 * | 3/2013 | Glass | ............... | G09B 7/02 434/236 |
| 2013/0138435 A1 * | 5/2013 | Weber | ............... | G06F 17/21 704/231 |
| 2013/0139193 A1 * | 5/2013 | Fan | ............... | H04N 7/157 725/14 |
| 2013/0226578 A1 * | 8/2013 | Bolton | ............... | H04N 21/4758 704/235 |

OTHER PUBLICATIONS

Office Action for corresponding Chinese Patent Application No. 201380028303.8, dated Aug. 15, 2016, 27 pages.

Chinese Office Action for related Chinese Patent Application No. 201380028308.8 dated Mar. 13, 2017, 10 Pages.

\* cited by examiner

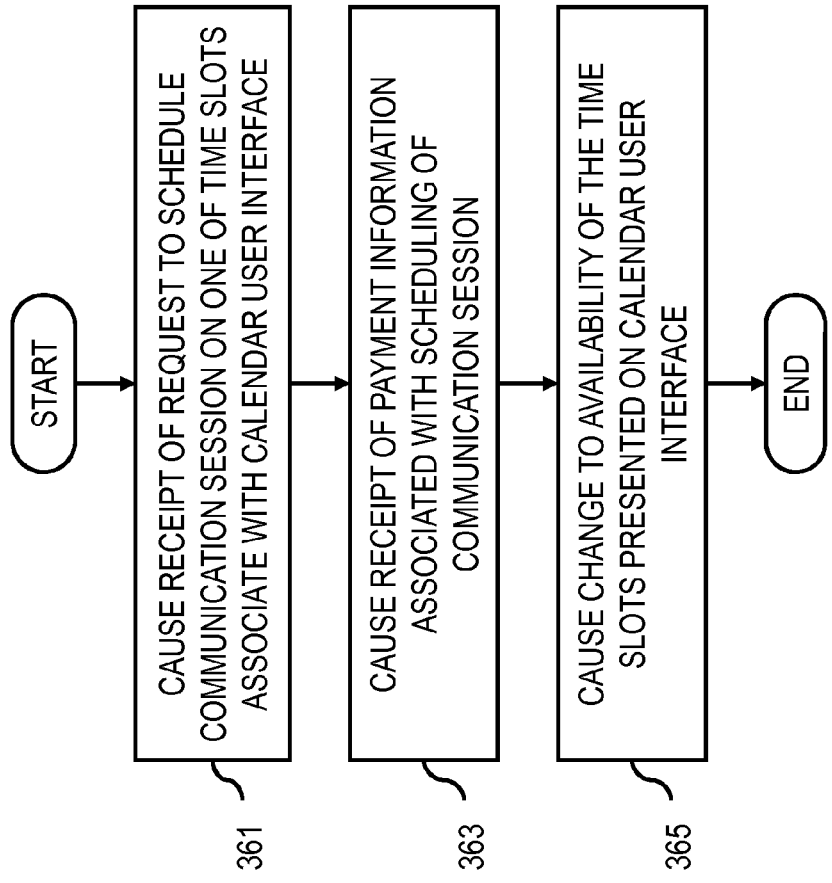

LI HUI

| | QUESTIONS |
|---|---|
| 1 | TELL ME A LITTLE BIT ABOU THE HIGH SCHOOL YOU ATTEND. |
| 2 | WHAT ARE SOME EXTRACURRICULAR ACTIVITIES AT YOUR HIGH SCHOOL? |
| 3 | HOW DID THE "CARPOOL CLUB" [THAT YOU STARTED] WORK? |
| 4 | HOW DID [THE CARPOOL CLUB] WEBSITE WORK? |
| 5 | CAN YOU GIVE ME AN EXAMPLE OF SOMETHING IN YOUR BACKGROUND THAT HAS DEEPLY AFFECTED YOU? |
| 6 | WHAT ARE SOME TOPICS THAT YOU ARE LOOKING FORWARD TO STUDYING IN COLLEGE? |

SCHOOL
SELECT
EMAIL
CODE
GO 421
423
425
427
429

METHOD AND SYSTEM FOR PROVIDING SEGMENT-BASED VIEWING OF RECORDED SESSIONS

RELATED APPLICATIONS

This application claims the benefit of the earlier filing date under PCT Rule 80 and 35 U.S.C. §119(e) of U.S. Provisional Application Ser. No. 61/616,702 filed Mar. 28, 2012, entitled "Method and System for Providing Segment-Based Viewing of Recorded Sessions," the entirety of which is incorporated herein by reference.

FIELD OF THE INVENTION

The present invention relates to recording of sessions (e.g., interview sessions) for network distribution, and more particularly, to the organization and presentation of video recordings of such sessions.

BACKGROUND OF THE INVENTION

The phenomenal growth in the mobility of students and job seekers has increased the demand for the ability to effectively evaluate applicants in a way that partially or wholly obviates the need for real-time meetings, regardless of whether the meetings are in-person or over one or more communication networks. Typical solutions, however, do not provide a cost-effective way of archiving recorded videos of interview sessions for later viewing and evaluation with colleagues when making hiring or admission decisions. In addition, many solutions are not designed to ensure a high quality viewer experience. For example, even if a recorded video loads quickly, the viewer is generally unable to intelligently select portions of the video for playback. Thus, typical solutions lack efficiency with respect to reviewing and evaluating applicants through recorded sessions. Therefore, there is a need for segment-based viewing of recorded sessions.

SUMMARY OF THE INVENTION

Convenience, expense, and other needs are addressed by the present invention, in which an approach is provided for segment-based viewing of recorded sessions.

According to one embodiment, a method comprises determining one or more segments of a communication session based on content of the communication session. The method also comprises associating the one or more segments with a recording of the communication session. The method further comprises causing, at least in part, a presentation of the recording and one or more indicators for navigating playback of the recording based on the one or more segments, wherein the one or more indicators correspond to the one or more segments.

According to another embodiment, an apparatus comprises at least one processor, and at least one memory including computer program code for one or more computer programs, the at least one memory and the computer program code configured to, with the at least one processor, cause, at least in part, the apparatus to determine one or more segments of a communication session based on content of the communication session. The apparatus is also caused to associate the one or more segments with a recording of the communication session. The apparatus is further caused to cause, at least in part, a presentation of the recording and one or more indicators for navigating playback of the recording based on the one or more segments, wherein the one or more indicators correspond to the one or more segments.

According to another embodiment, a computer-readable storage medium carries one or more sequences of one or more instructions which, when executed by one or more processors, cause, at least in part, an apparatus to determine one or more segments of a communication session based on content of the communication session. The apparatus is also caused to associate the one or more segments with a recording of the communication session. The apparatus is further caused to cause, at least in part, a presentation of the recording and one or more indicators for navigating playback of the recording based on the one or more segments, wherein the one or more indicators correspond to the one or more segments.

According to another embodiment, an apparatus comprises means for determining one or more segments of a communication session based on content of the communication session. The apparatus also comprises means for associating the one or more segments with a recording of the communication session. The apparatus further comprises means for causing, at least in part, a presentation of the recording and one or more indicators for navigating playback of the recording based on the one or more segments, wherein the one or more indicators correspond to the one or more segments In addition, for various example embodiments, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments, the following is also applicable: a method comprising facilitating access to at least one interface configured to allow access to at least one service, the at least one service configured to perform any one or any combination of network or service provider methods (or processes) disclosed in this application.

For various example embodiments, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3C is a flowchart of a process for providing a calendar system for accommodating reservations of interviews associated with segment-based viewing of interview videos, according to an exemplary embodiment;

FIG. 4B is a diagram of a user interface that supports signing into a rating mechanism associated with segment-based viewing of recorded sessions, according to an exemplary embodiment;

DESCRIPTION OF THE PREFERRED EMBODIMENT

Examples of approaches for providing segment-based viewing of recorded sessions are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
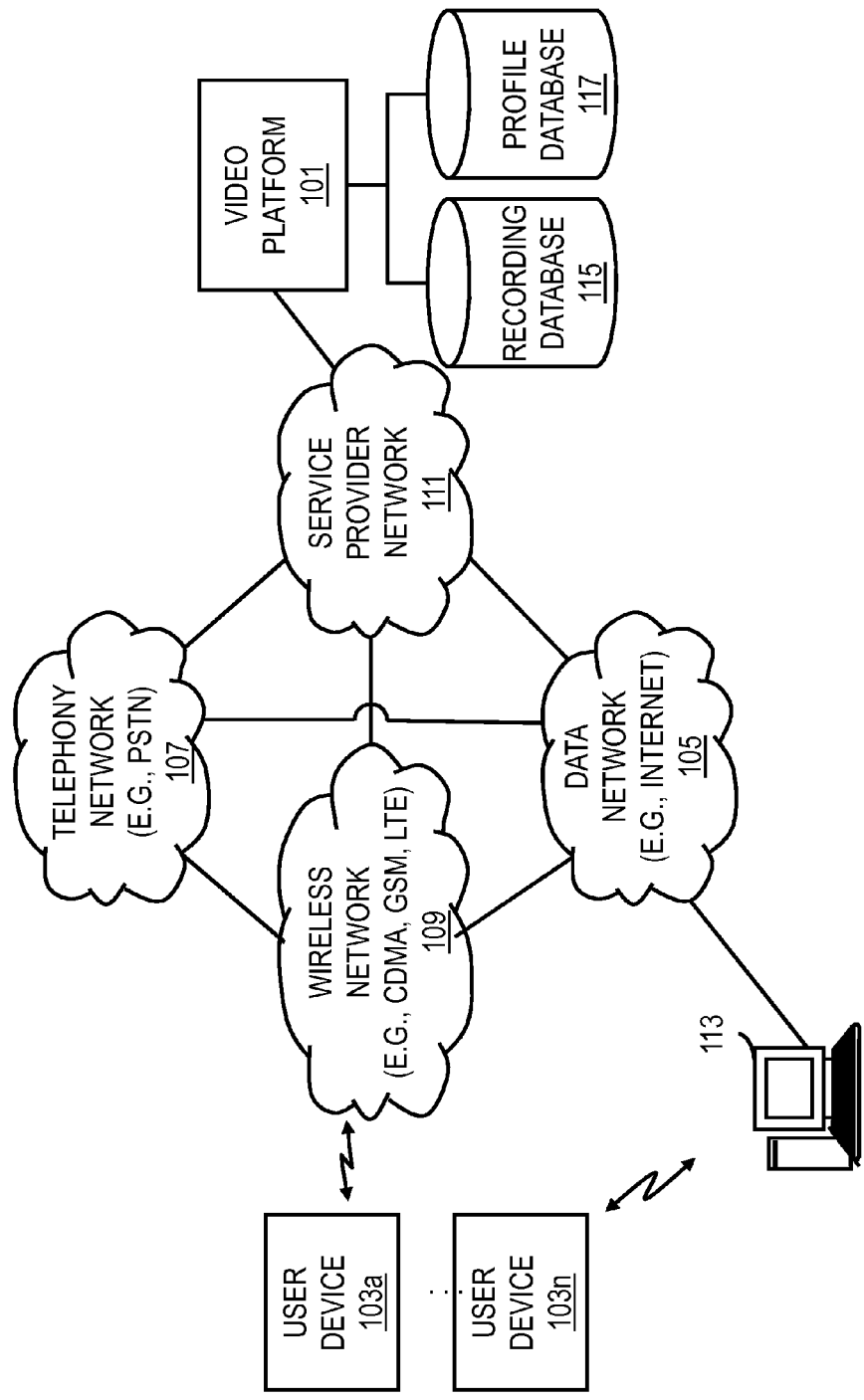
FIG. 1 is a diagram of a system capable of providing segment-based viewing of recorded sessions, according to an exemplary embodiment.

FIG. 1 is a diagram of a system capable of providing segment-based viewing of recorded sessions, according to an exemplary embodiment. For the purpose of illustration, the system 100 employs a video platform 101 that is configured to facilitate recording of various communication sessions (e.g., interviews, meetings, etc.), review of the recorded sessions, rating of the recorded sessions, payments for the recorded sessions, etc. One or more user devices (e.g., user devices 103 (or user devices 103a-103n)) may, for instance, be utilized to initiate access to one or more services (e.g., to view recorded interview sessions) over one or more networks (e.g., data network 105, telephony network 107, wireless network 109, service provider network 111, etc.). According to one embodiment, the one or more services may be managed services supplied by a service provider (e.g., a wireless communication company) as a hosted or a subscription-based service made available to users of the user devices 103 through the service provider network 111. As shown, the video platform 101 may be a part of or connected to the service provider network 111. According to another embodiment, the video platform 101 may be included within or connected to the user devices 103, a computing device 113, etc. While specific reference will be made thereto, it is contemplated that the system 100 may embody many forms and include multiple and/or alternative components and facilities. Video platform 101, in some embodiments, can effectively reduce the time needed for evaluators to review recorded interview sessions, enhance collaboration between evaluators, administrators, etc., and decrease overall costs associated with the decision and/or evaluation process.

In certain embodiments, the video platform 101 may include or have access to a recording database 115 and a profile database 117. The recording database 115 may, for instance, include recordings of communication sessions that are uploaded by users, data for determining segments of the communication sessions, etc. The profile database 117 may include account information associated with applicants (or interviewees), interviewers, evaluators, or administrators, rating information assigned by or assigned to the applicants, the interviewers, or the evaluators, etc.

It is noted that the user devices 103 may be any type of mobile or computing terminal including a mobile handset, mobile station, mobile unit, multimedia computer, multimedia tablet, communicator, netbook, Personal Digital Assistants (PDAs), smartphone, media receiver, personal computer, workstation computer, video recorder, television, etc. It is also contemplated that the user devices 103 may support any type of interface for supporting the presentment or exchange of data. In addition, user devices 103 may facilitate various input means for receiving and generating information, including touch screen capability, keyboard and keypad data entry, voice-based input mechanisms, accelerometer (e.g., shaking the user device 103), and the like. Any known and future implementations of user devices 103 are applicable. It is noted that, in certain embodiments, the user devices 103 may be configured to establish peer-to-peer communication sessions with each other using a variety of technologies—i.e., near field communication (NFC), Bluetooth, infrared, etc. Also, connectivity may be provided via a wireless local area network (LAN). By way of example, a group of user devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 103, i.e., IP addresses that are accessible to devices connected to the service provider network 111 as facilitated via a router.

As mentioned, the growth in the mobility of users (notably students and job seekers) has increased the demand for the ability to effectively evaluate applicants in a way that partially or wholly obviates the need for real-time meetings, regardless of whether the meetings are in-person or over one or more communication networks. Such demand is particularly significant, for instance, when considering communication challenges across time zones. Furthermore, many evaluators (e.g., hiring for an organization, making admission decisions, etc.) want a system that allows for easy collaborative evaluations of their candidates.

Typical solutions, however, do not provide a cost-effective way of systematically archiving video interviews for later viewing and evaluation with colleagues when making hiring or admissions decisions. Moreover, many current solutions are not designed in a way to ensure a high quality viewer experience, and are often fraught with technical issues which make the experience unpleasant for the applicant and less than optimized for the ultimate evaluator. As discussed, the viewer is generally not provided with a way to intelligent select portions of a recording for playback, preventing quick and easy navigation of the recording. However, such navigation is crucial since an individual evaluating tens, hundreds, or even thousands of applicants does not have the time to watch extended video interviews. In addition, many services for producing large volumes of video interviews require that the video interviews follow a particular format with automated questions to enable more efficient evaluations. As such, such services do not allow for unscripted interviews and vibrant exchange between the interviewer and interviewee, and, thus, limit the value of the interviews. As used herein, "unscripted interviews" can refer to a spoken dialogue in which the interviewee is not provided with a predetermined script in the communication exchange; as such, the dialogue has an element of spontaneity and unpredictability.

To address this issue, the system 100 of FIG. 1 introduces the capability to provide segment-based viewing of recorded sessions (e.g., unscripted interviews). It is noted that although various embodiments are described with respect to video recordings of interview sessions, it is contemplated that the approach described herein may be used with other types of recordings and other types of sessions (e.g., audio recording of an interview, video recording of a meeting, etc.). By way of example, when a recording of an unscripted, one-on-one interview session is uploaded to the video platform 101, one or more segments of the interview session may be determined based on the content of the interview session (e.g., the questions asked, the topics discussed, etc., during the interview), and then associated with the recording. Later, when an evaluator accesses a service associated with the video platform 101 to view the recording, the evaluator may be presented with the recording and one or more indicators (e.g., corresponding to the one or more segments) for navigating playback of the recording based on the one or more segments. It is also noted that because the system 100 allows for unscripted exchanges during the interview, the value of the interviews may be greatly increased. Specifically, unscripted exchanges enable interviewees to demonstrate their interpersonal skills, which are crucial to success in today's dynamic university and professional environments.

In certain embodiments, evaluators (or other users) may be able to assign a rating the recording, the interview session, the interviewee, the interviewer, etc. The rating may be then stored and/or shared to others (e.g., the interviewee, the interviewer, other evaluators, other users, etc.), for instance, to enable the evaluator's evaluations to be compared and reviewed collaboratively with the evaluations of other colleagues. In various embodiments, the cost of evaluating the applicants may be financed by the applicant to decrease the cost to institutions, for instance, conducting the hiring process, the admissions process, etc. In one scenario, applicants may be required to pay for the interview along with other fees when they sign up for the interview.

Figure 2:
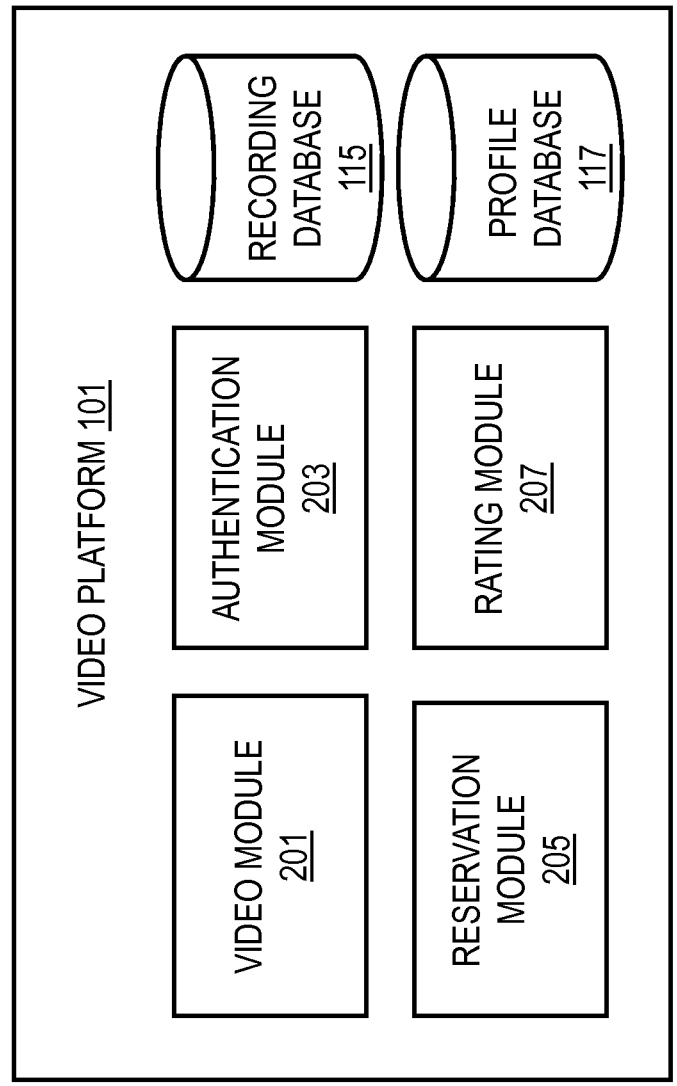
FIG. 2 is a diagram of a video platform, according to an exemplary embodiment.

FIG. 2 is a diagram of the video platform 101, according to an exemplary embodiment. The video platform 101 may include a video module 201, an authentication module 203, a reservation module 205, a rating module 207, the recording database 115, and the profile database 117.

In one embodiment, the video module 201 may determine segments of a communication session based on content of the communication session. The video module 201 may also associate the segments with a recording of the communication session. Further, the video module 201 may cause a presentation of the recording and indicators for navigating playback of the recording based on the segments. The indicators may correspond to the segments. The communication session may be among communication sessions associated with a service and the communication sessions may include video media of an unscripted interview. The segments, the recording and/or, the communication sessions may be stored in the recording database 115.

In one embodiment, the authentication module 203 may determine an authorization to rate the segments, the recording and/or, the communication sessions. Further, the authentication module 203 may associate the recording with a user account and may cause an access to the recording based on an authentication of the user account. For example, as a reviewer/evaluator evaluates the segments, the recordings, and/or the communication sessions, an identity or a credential of the reviewer may need to be verified before the reviewer is authorized to access the segments, the recordings, and/or the communication session. The reviewer may be initially invited to enter the reviewer's log-in identity and password, email address, affiliation with an organization, name, authentication codes, etc. associated with the reviewer's user account. Upon receiving a combination of the identities and/or the credentials, the authentication module 203 may verify the identities and/or credentials and grant an access to the segments, the recording and/or, the communication sessions. The reviewer may be pre-registered with the video platform 101 and the registered reviewer's identity and credential information may be stored in the profile database 117 in encrypted form.

In one embodiment, the reservation module 205 may cause a receipt of a request to schedule a communication session on one of one or more time slots associated with a calendar user interface. The calendar user interface may be associated with a calendar system associated with the video platform 101. The reservation module 205 may also cause a receipt of payment information associated with the scheduling of the communication session. The reservation module 205 may also cause a financial transaction (e.g., electronic transaction) for the payment through a financial institution based on the payment in formation. Further, the reservation module 205 may cause a change to a time block representing availability of the time slots on the calendar user interface. The reservation module 205 may also cause a receipt of a request to cancel or modify the scheduled communication session. The reservation module 205 may also cause a transmission of a reminder message to a registered user about the communication session schedule.

In one embodiment, the rating module 207 may cause a receipt of ratings associated with the segments, the recordings, and/or the communication session. The rating module 207 may cause a transmission of the recording and/or the communication session to cause reviews of the segments, the recording, and/or the communication session by a reviewer/evaluator. The rating module 207 may send a hyperlink or an invitation to the recording and/or the communication in the reviewer. Further, the rating module 207 may cause a generation of a report based on the ratings and/or the reviews. The ratings may be aggregated for various calculations and/or analysis. The generated report may be stored into a file (e.g., excel, work, pdf format) or hyperlinked. The report file or the hyperlink to the report may be included in an out-going message.

Figure 3A:
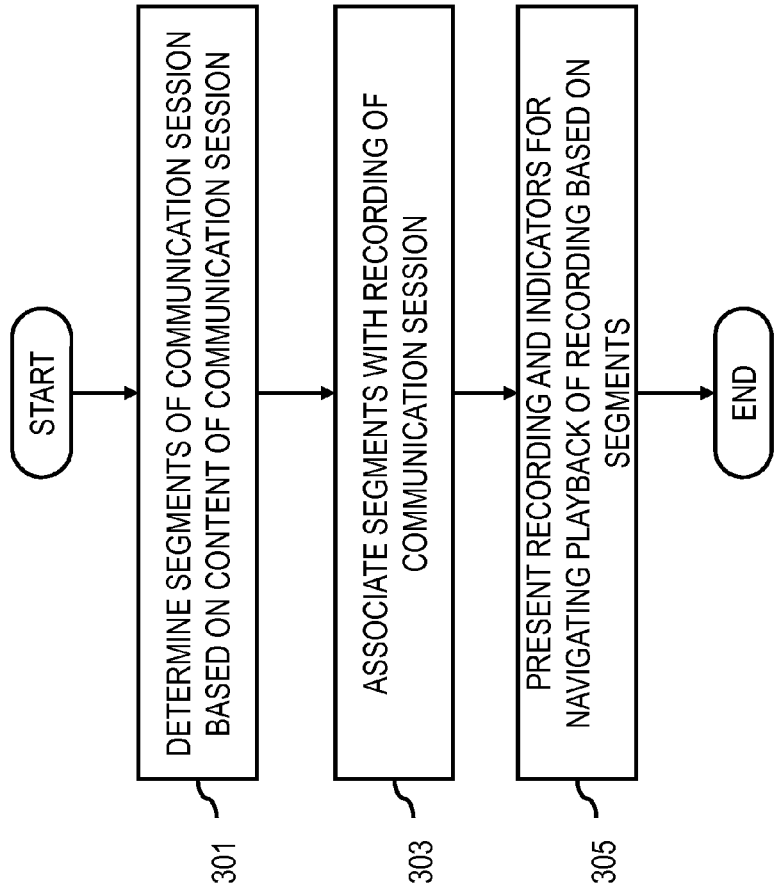
FIG. 3A is a flowchart of a process for providing segment-based viewing of recorded sessions, according to an exemplary embodiment.

FIG. 3A is a flowchart of a process for providing segment-based viewing of recorded sessions, according to an exemplary embodiment. For the purpose of illustration, process 300 is described with respect to FIG. 1. It is noted that the steps of the process 300 may be performed in any suitable order, as well as combined or separated in any suitable manner. In step 301, the video platform 101 may determine one or more segments of a communication session based on content of the communication session. By way of example, when a recorded interview session is uploaded, the video platform 101 may automatically perform audio analysis on the interview video to determine the questions asked, the topics discussed, etc. (e.g., based on the actual language of the interview session). As such, the segments of the communication session may then be identified (e.g., without user intervention) based on the determined questions, topics, etc., of the interview session. Thereafter, the video platform 101 may, at step 303, associate the one or more segments with a recording of the communication session.

In step 305, the video platform 101 may then present the recording and one or more indicators for navigating playback of the recording based on the one or more segments, wherein the one or more indicators correspond to the one or more segments. In this way, evaluators may effectively and efficiently review recordings of communication session (e.g., unscripted, one-on-one video interviews), for instance, by using the indicators (e.g., tabs, buttons, etc.) to quickly navigate through the recordings (e.g., based on the questions asked, the topics discussed, etc.).

Figure 3B:
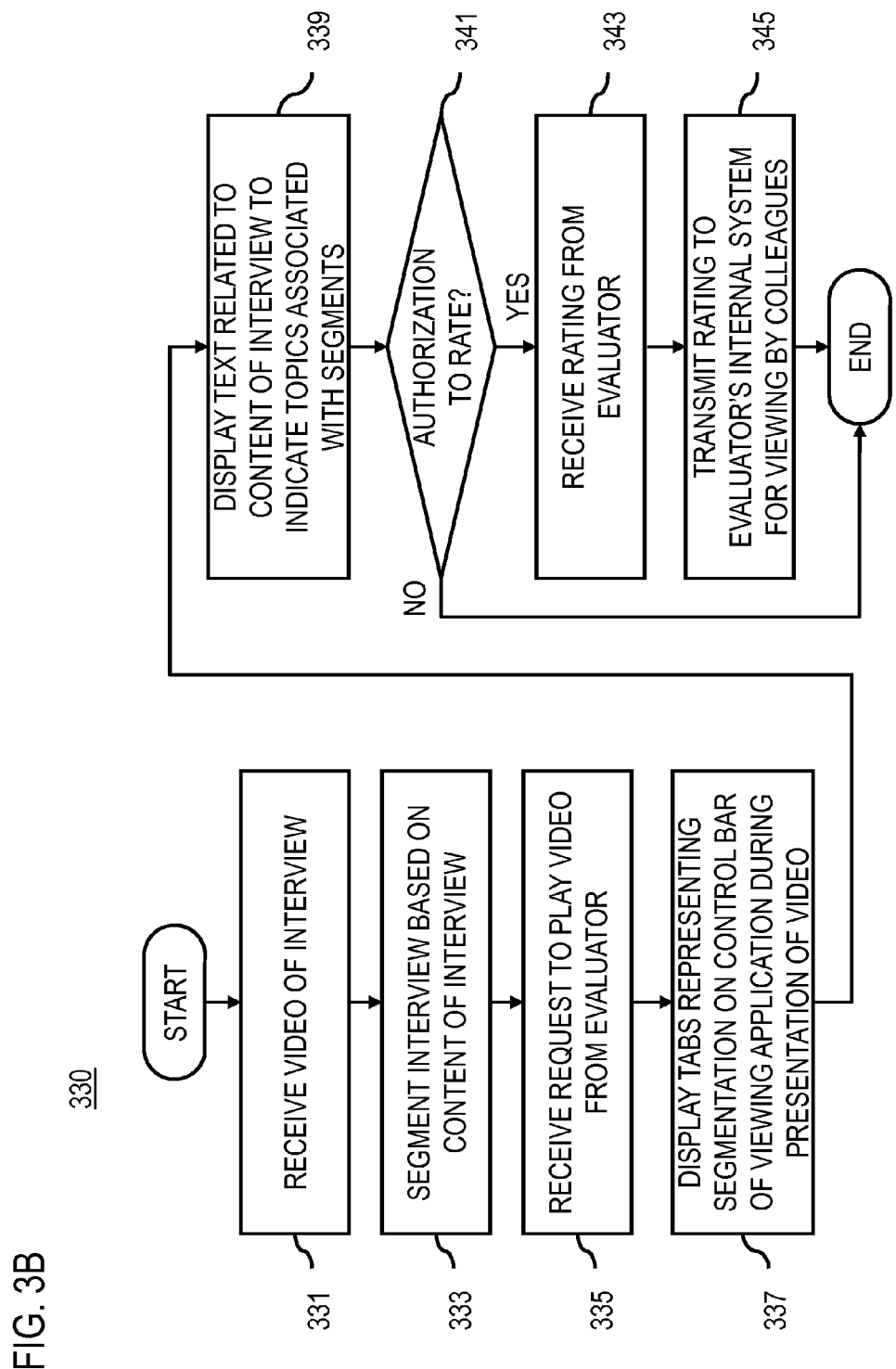
FIG. 3B is a flowchart of a process for collaborative evaluation of applicants using segment-based viewing of interview videos, according to an exemplary embodiment.

FIG. 3B is a flowchart of a process for collaborative evaluation of applicants using segment-based viewing of interview videos, according to an exemplary embodiment. For the purpose of illustration, process 330 is described with respect to FIG. 1. It is noted that the steps of the process 330 may be performed in any suitable order, as well as combined or separated in any suitable manner. In step 331, the video platform 101 may receive the interview video, for instance, from an interviewer. By way of example, the video platform 101 may facilitate an interview session being conducted by a live, trained interviewer who may lead the interview, provide accurate video recording of the interview session, and ensure that the sound and video quality of the video recording is sufficient. After the interview, the interviewer may perform minor editing of the interview video and prepare the video for uploading to the interview video. It is noted that, in some embodiments, the interview video may be uploaded to the video platform 101 in multiple formats (e.g., to ensure compatibility with other platforms and applications, to optimize the viewing experience, etc.). In other embodiments, the video platform 101 may accept the interview video in a number of various formats, and may perform conversions of the interview video to other formats (e.g., to ensure compatibility with other platforms and applications, to optimize the viewing experience, etc.). In one scenario, for instance, the video platform 101 may reorganize the interview video based on the segments of the interview session (e.g., the resulting interview video may follow a particular topic/question order). In another scenario, the uploaded file may be processed to produce multiple versions in various file formats.

The video platform 101 may then, at step 333, facilitate segmentation of the interview session based on content of the interview session, such as the questions asked, the topics discussed, etc. In one embodiment, the video platform 101 may, for instance, perform audio analysis on the received interview video to determine the questions asked, the topics discussed, etc. (e.g., based on the actual language of the interview session). At step 335, the video platform 101 may receive a request to play the interview video from an evaluator (e.g., the evaluator may access a web-based platform to initiate the request). In response, the video platform 101 may present the evaluator with the interview video (e.g., via a web-based viewing application) along with tabs representing the segmentation of the interview session on a control bar (e.g., the bar indicating the extent to which the video content has been loaded, played, etc.) the viewing application (step 337). In one scenario, for instance, clicking on these tabs may enable the evaluator to intelligently navigate to different segments of the interview video (e.g., based on the segmentation of the interview session). In step 339, the video platform 101 may display text related to the content of the interview session in buttons corresponding with the tabs for the purpose of indicating the general topics of each segment. To improve the evaluator's experience, these buttons may, for instance, be presented next to the video to allow the evaluator to quickly navigate between segments (e.g., by clicking on the various buttons).

In certain embodiments, the evaluator may use a sliding control feature to slide a marker on a number scale to ascribe a rating (e.g., a number rating) to the interview video, the interview session, the interviewee, the interviewer, etc. In further embodiments, authorization based on the evaluator's credentials may be required to ascribe the rating (e.g., the evaluator may be required to provide authorization using her email address and password). As an example, in step 341, the video platform 101 may determine whether the evaluator has authorization to rate the interview video, the interview session, the interviewee, the interviewer, etc. In step 343, for instance, the video platform 101 may accept a rating from the evaluator if the evaluator is authorized to ascribe such ratings. The video platform 101 may then, at step 345, transmit the rating (and the interview video) to the evaluator's internal system for viewing by the evaluator's colleagues, for instance, to enable additional comments in a collaborative fashion. It is noted that, in various embodiments, the applicant (or the interviewee) may pay for the interview, for instance, when she signs up for the interview. As such, the interviews may be provided at no cost for the institution to which the applicant is applying, and, thus, further increasing the degree to which institutions are receptive to the services offered by the video platform 101.

FIG. 3C is a flowchart of a process for providing a calendar system for accommodating reservations of interviews associated with segment-based viewing of interview videos, according to an exemplary embodiment. For the purpose of illustration, process 360 is described with respect to FIG. 1. It is noted that the steps of the process 360 may be performed in any suitable order, as well as combined or separated in any suitable manner.

In step 361, the video platform 101 may cause, at least in part, a receipt of a request to schedule a communication session on one of one or more time slots associated with a calendar user interface. The request to schedule a communication session (e.g., an interview) may be transmitted from a user device, such as a mobile phone, personal computer, other computing devices, etc. The calendar user interface may be rendered on a display of the user device. The calendar user interface may indicate availability of each date for the communication session. A user click on one of the dates on the calendar may render available time slots by more specific time (e.g., by hours, half-hours, etc.). As the user selects the specific time, if the time slot is available, a next step page for scheduling the communication session may be rendered (e.g., a registration page requiring user's further information). If the time slot is not available, the next page may present an unavailability message. Upon the selection of the time slot and/or completion of the registration information, price information associated with scheduling the communication session may be transmitted to the user device with an invitation to pay. The invitation to pay may include information about options to pay, a payment user interface, security measures, etc. The price information may vary depending on types, lengths, date and time, etc. of the communication session the user register for.

In step 363, the video platform 101 may cause, at least in part, a receipt of payment information associated with the scheduling of the communication session. The user device may receive the invitation through which the user may select one of the options to pay and enter payment information (e.g., credit card information, banking information, etc.) associated with the user. The payment information may be received by the video platform 101 and a payment transaction may be made through a financial institution or service based on the payment information. A discount code or organization code which may discount the price or waive the payment may be included in the payment information. The payment transaction may be held until the user completes the communication session. The receipt of the payment information may cause a generation of a receipt for payment which may be transmitted to the user via email or other forms of electronic messaging.

In step 365, the video platform 101 may cause, at least in part, a change to a time block representing availability of the one or more time slots on the calendar user interface. The time blocks on the calendar user interface may represent a date and availability of the time slots for the communication session. For example, if more than 10% of the time slots are available, the block may indicate that the date is "open" for a registration. If less than 10% of the time slots are available, the block may indicate that the date has "just a few spots available". If there no time slots are available, the block may indicate that the date is fully booked. For the date the communication session is not provided, the block may indicate that the date is not open. By way of example, as the user completes the registration for the communication session, if the availability of the time slots becomes less than 10%, the block originally indicated "open" may be changed to "just a few spots available." In opposite, if the registered user cancels the registration or an administrator (of the calendar system associated with the calendar user interface) increases the available slots, the block indicated as "fully booked" or "just a few spots available" may be changed to "just a few spots available" or "open." Further, the blocks may be changed arbitrarily or manually by the administrator. For example, even if the time slots for a date is not fully booked, the administrator may be able to change the block for the date to indicate "fully booked."

Figure 4A:
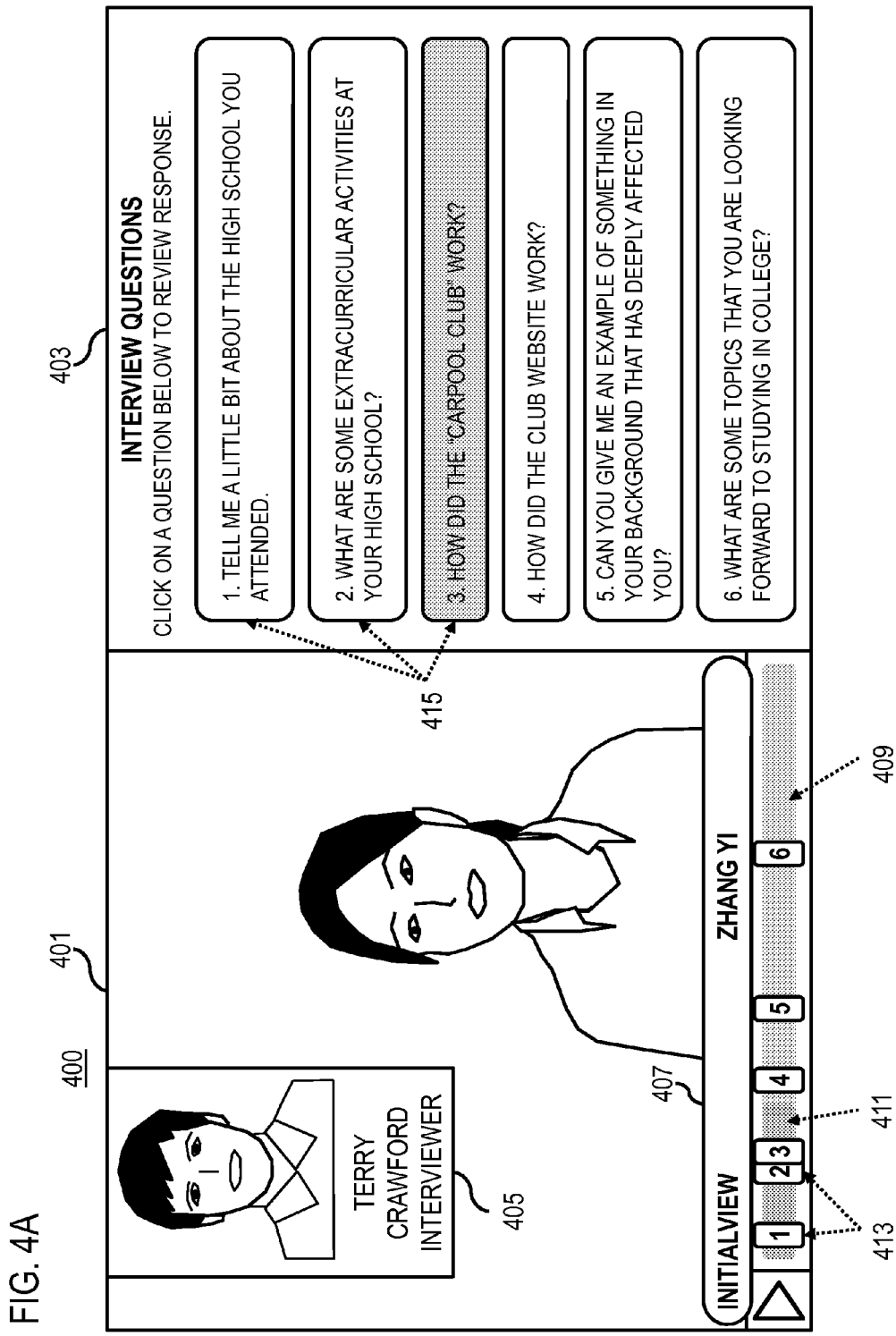
FIG. 4A is a diagram of a user interface that supports segment-based viewing of recorded sessions, according to an exemplary embodiment.

FIG. 4A is a diagram of a user interface that supports segment-based viewing of recorded sessions, according to an exemplary embodiment. As shown, the user interface 400 includes a video section 401 and an interview questions section 403. The video section 401 may, for instance, include a rendering of the recorded interview session of the interviewee (e.g., the applicant), an interviewer window 405 depicting details along with an image of the interviewer, and an interviewee bar 407 depicting information with respect to the interviewee. In addition, the video section 401 may include a control bar 409 for navigating through the recorded interview session and a load/status indicator (e.g., to indicate the extent that the video has load, the location status of the current video frame, etc.). To enable quicker, more efficient navigation of the recorded interview session, the control bar 409 may, for instance, include one or more tabs 413. As discussed, each of the tabs 413 may correspond to a particular segment of the recorded interview session. As such, clicking on a certain tab 413 may, for instance, cause the user interface 400 to start playing the segment of the recorded interview session associated with the certain tab 413.

Moreover, as illustrated, the interview questions section 403 may include buttons 415. As mentioned, tabs 413 and buttons 415 may correspond to each other. By way of example, the particular button 415 associated with the question "How did the club website work?" may correspond to the tab 413 featuring the number "4." Thus, in one scenario, the user interface 400 may enable the user to cause the user interface 400 to start playing the segment of the recorded interview session associated with the tab 413 featuring the number "4" by clicking on the particular button 415 as another way to enable faster, more efficient navigation of the recorded interview session. Furthermore, as shown, the button 415 associated with the question "How did the 'Carpool Club' work?" is highlighted since the user interface 400 is currently playing the segment associated with the tab 413 featuring the number "3." As a result, the buttons 415 can assist the user in evaluating the answer currently being given by the interviewee.

FIG. 4B is a diagram of a user interface that supports signing into a rating mechanism associated with segment-based viewing of recorded sessions, according to an exemplary embodiment. As shown, a user interface 420 may include a signing-in area 421. The signing-in area 421 may include a selection bar 425, a code bar 429, an email bar 423, and a go button 427. A hyperlink to the user interface 420 may be sent to an evaluator who rates a video recording presented on the user interface 420. The hyperlink may be embedded in an email or a message sent to the evaluator. Upon clicking the hyperlink, the evaluator may be presented with the user interface 420. The user interface 420 may be rendered on a specific application or a web-browser. The signing-in area 421 accommodates authentication of the evaluator's identity before the evaluator access into a rating mechanism or system. The selection bar 425 accommodates selecting of a school the evaluator (e.g., admissions officer, dean, professor, etc.) is affiliated. Instead, the selection bar 425 may accommodate a selection of an entity, an organization, or a group the evaluator is affiliated with. The code bar 429 accommodates typing in a code associated with the evaluator (e.g., authentication code, a school code, etc.). The email bar 423 accommodates typing-in of an email address associated with the evaluator. After a selection is made from the selection bar 425 and the code bar 429 and email bar 423 are typed-in, clicking the go button 427 causes a transmission of the received information to the authentication module 203 for a verification of the evaluator's identity and a grant of access to the rating system. The authentication module 203 may be included in the video platform 101. In that way, limited access to the rating system can be provided.

Figure 4C:
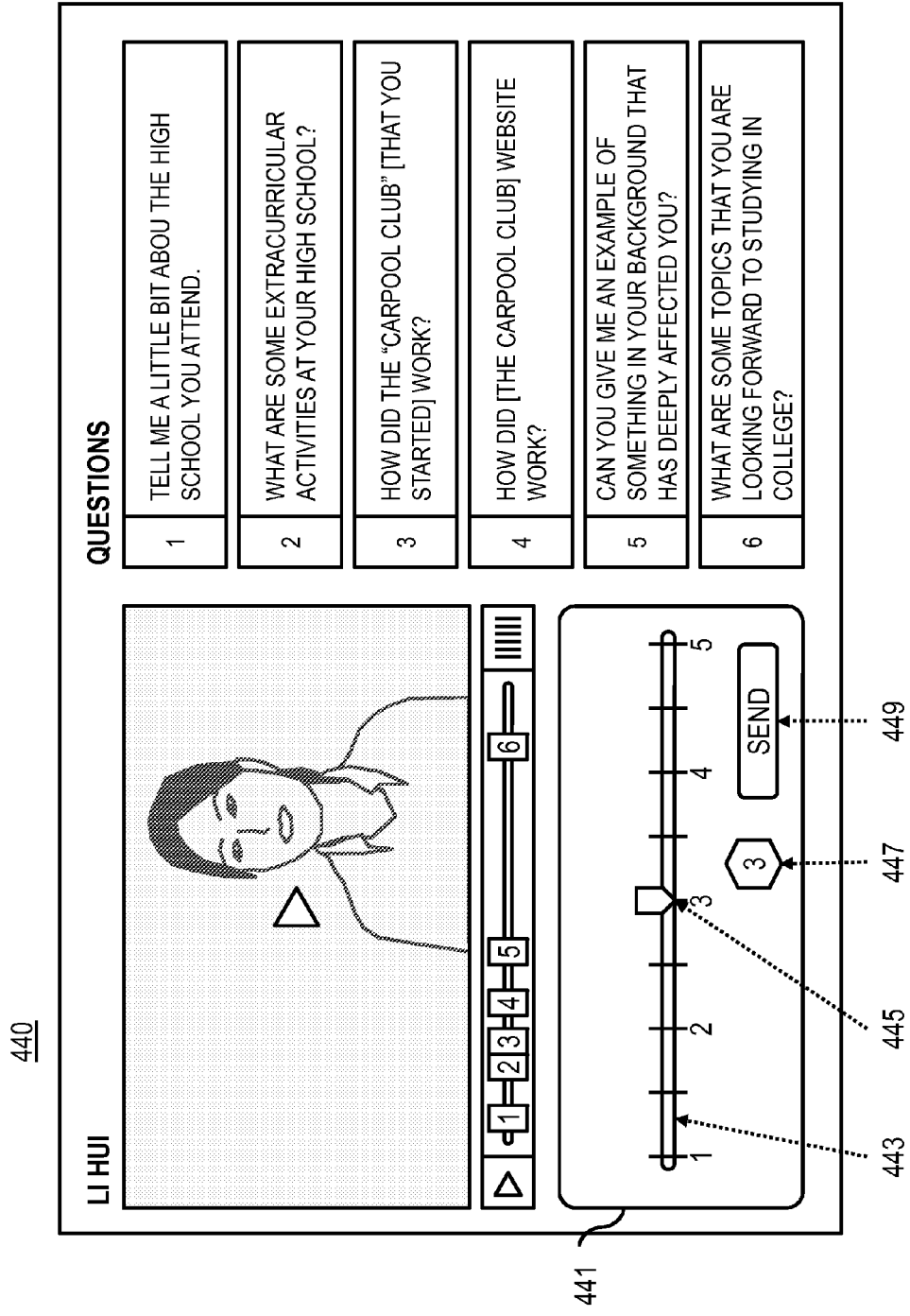
FIG. 4C is a diagram of a user interface that supports a rating mechanism associated with segment-based viewing of recorded sessions, according to an exemplary embodiment.

FIG. 4C is a diagram of a user interface that supports a rating mechanism associated with segment-based viewing of recorded sessions, according to an exemplary embodiment. As shown, a user interface 440 may include a rating area 441. The rating area 441 may include a scale bar 443, a sliding cursor 445, a rating indicator 447, and a send button 449. The scale bar 443 and the sliding cursor 445 accommodate selecting a rating from 1 to 5 rating scale. The selected rating may be indicated in the rating indicator 447. After the rating is selected, clicking the send button 449 cause a transmission of the selected rating to the rating module 207 for records. The rating module 207 may be included in the video platform 101. Clicking the send button may cause a transmission of the selected rating via email or a storage of the selected rating into a file. The rating area 441 may be re-rendered or refresh as a different question associated with a different segment of a recorded session (e.g., interview) is selected. In that way, segment-based rating of recorded sessions (e.g., interview session) may be provided.

Figure 4D:
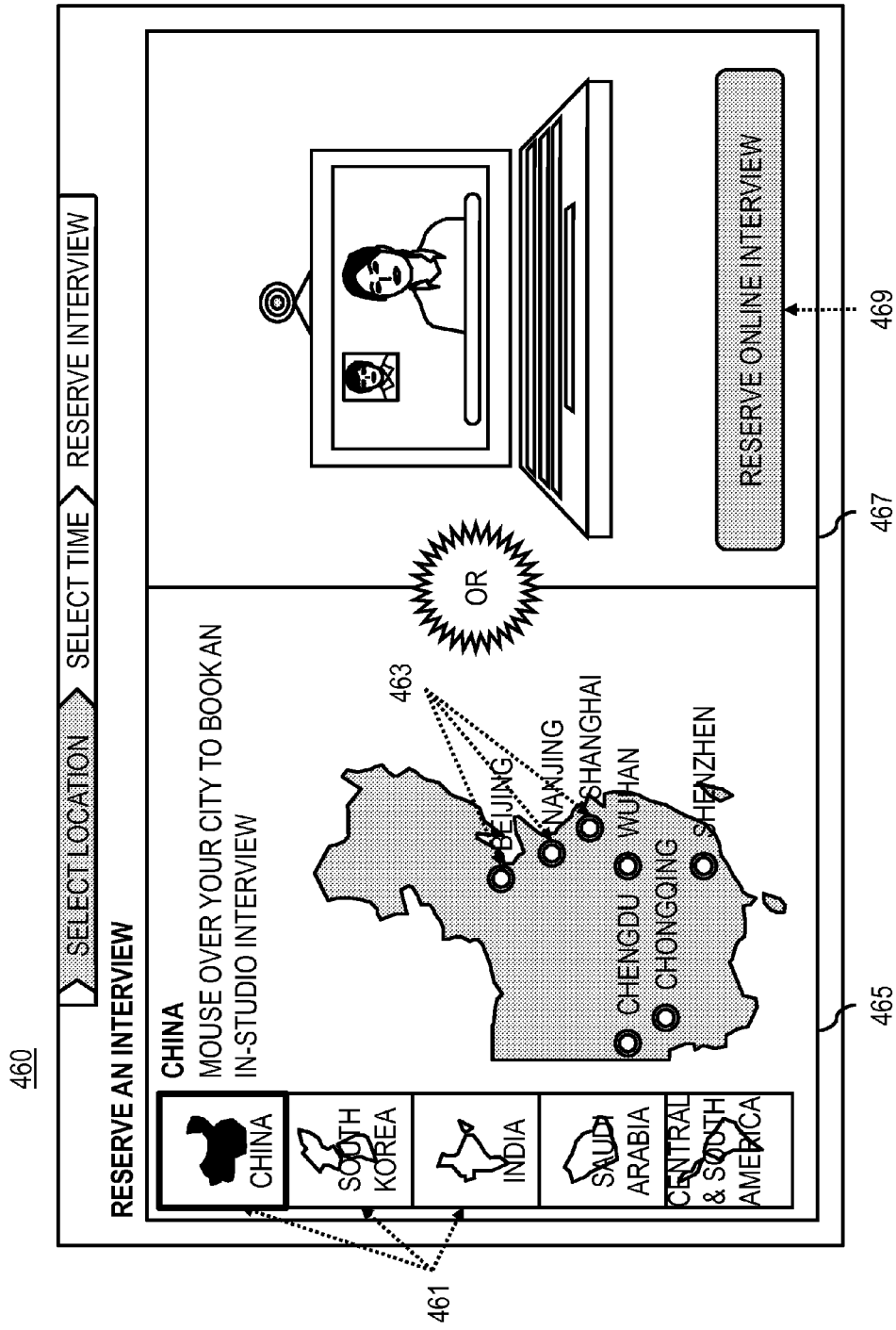
FIG. 4D is a diagram of a user interface that supports reserving an interview associated with segment-based viewing of recorded sessions, according to an exemplary embodiment.

FIG. 4D is a diagram of a user interface that supports reserving an interview associated with segment-based viewing of recorded sessions, according to an exemplary embodiment. As shown, a user interface 460 may include an on-site interview reservation section 465 and an online interview reservation section 467. The on-site interview reservation section 465 may include selectable countries 461 and selectable cities 463 available for on-site interview. For example, in the illustration, a country, e.g., China, is selected and available cities in China are presented on a Chinese map for a selection. The online interview reservation section 467 may include a reserve online interview button 469. Clicking on the available cities or the reserve online interview button, may cause transmission of the input to the reservation module 205 to render more specific reservation information, such as available time, corresponding to the input. The reservation module 205 may be included in the video platform 101. In that way, reserving an on-site or online interview is provided.

Figure 4E:
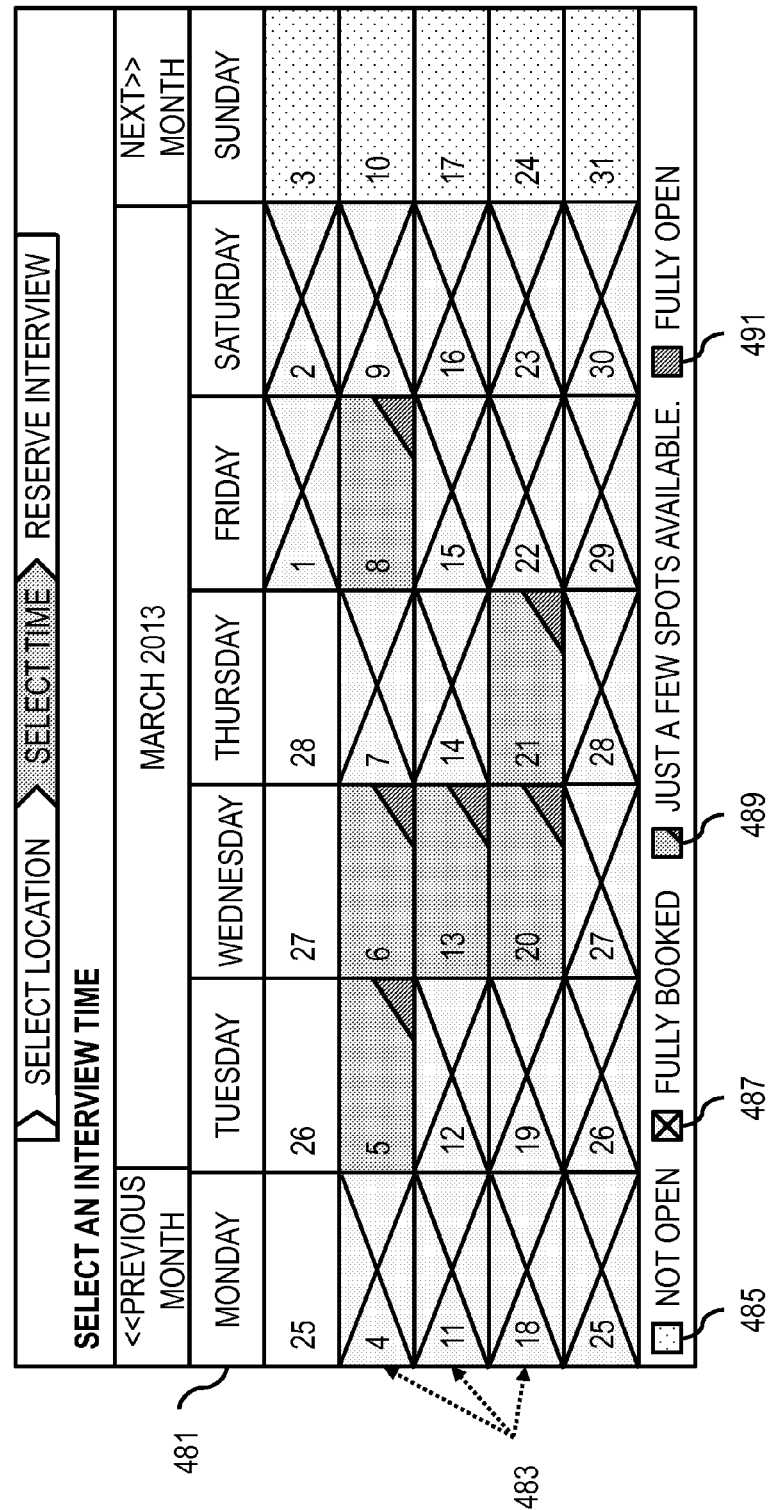
FIG. 4E is a diagram of a user interface that supports reserving, through a calendar system, an interview associated with segment-based viewing of recorded sessions, according to an exemplary embodiment.

FIG. 4E is a diagram of a user interface that supports reserving, through a calendar system, an interview associated with segment-based viewing of recorded sessions, according to an exemplary embodiment. As shown, a user interface 480 may include a calendar 481 with date blocks 483 including a "not open" block 485, a "fully booked" block 487, a "just a few spots available" block 489, and a fully open block 491. The user interface 480 may be presented or rendered based on an input from the user interface 460 selecting an on-site interview or an online interview. Any one of the data blocks 483 may be selected by a user. However, only the "just a few spots available" block 489 and the "fully open" block 491 may accommodate reserving an interview spot for the date. For example, in the illustration, clicking on March 4 would not allow a reservation of an interview spot for March 4, but clicking on March 5 would be able to accommodate reserving an interview spot from a few spots available on March 5. Also, the availability of the interview spots may be controlled by an administrator of the calendar. For example, there are actually available interview spots for March 7, but the block for March 7 has been manipulated by a calendar administrator to be shown as fully booked. In that way, reserving a interview time can be provided through a calendar system.

The processes described herein for providing segment-based viewing of recorded sessions may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
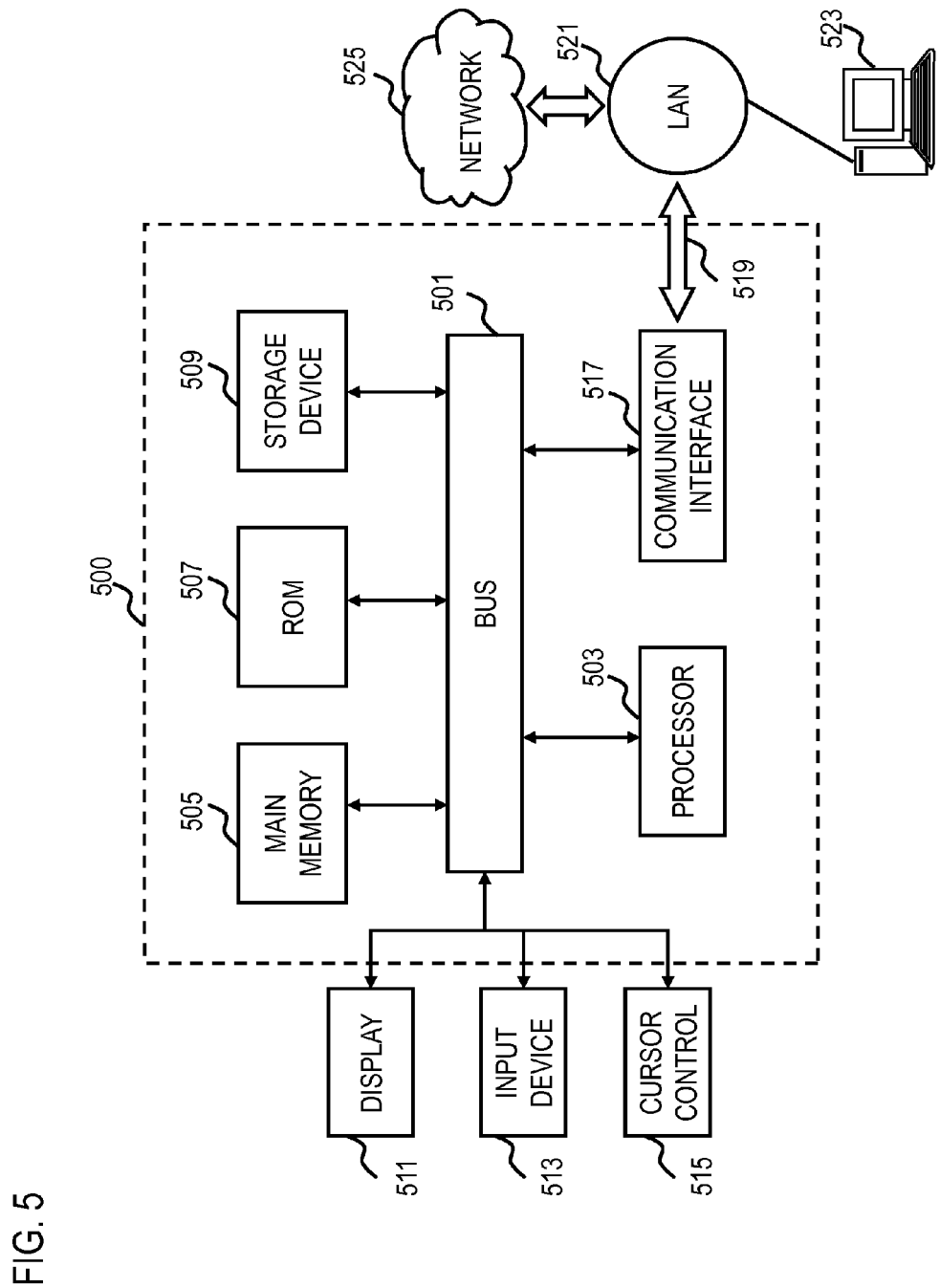
FIG. 5 is a diagram of a computer system that can be used to implement an exemplary embodiment of the present invention.

FIG. 5 illustrates a computer system 500 upon which an embodiment according to the present invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment of the invention, the processes described herein are provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look-up tables. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface which provides a data communication connection to a corresponding type of communication line. As another example, communication interface 517 may be a local area network (LAN) card (e.g. for Ethernet™ or an Asynchronous Transfer Mode (ATM) network) which provides a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the present invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 505 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, an approach is disclosed for providing segment-based viewing of recorded sessions.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining of a plurality of segments of a communication session based on content of the communication session, wherein the communication session includes video media of an unscripted interview of a user who is to be evaluated, and the plurality of segments are identified based on a plurality of questions posed as part of the unscripted interview;
   associating the plurality of segments with a recording of the communication session;
   causing, at least in part, a presentation of the recording and a plurality of indicators for navigating playback of the recording based on the plurality of segments, wherein the plurality of indicators correspond to the plurality of questions; and
   causing, at least in part, one or more ratings of one or more of the plurality of segments by one or more evaluators, the ratings being with respect to how the user replied to the corresponding questions.

2. A method of claim 1, comprising:
   determining an authorization of the one or more evaluators to rate the plurality of segments, the one or more evaluators participating in the evaluation of the user.

3. A method of claim 1, comprising:
   causing, at least in part, a transmission of the recording to cause a review of the plurality of segments.

4. A method of claim 1, comprising:
   associating the recording with an account associated with the user; and
   causing, at least in part, an access to the recording based, at least in part, on an authentication of the user account.

5. A method of claim 1, comprising:
   causing, at least in part, a receipt of a request to schedule a communication session on one of a plurality time slots associated with a calendar user interface.

6. A method of claim 5, comprising:
causing, at least in part, a receipt of payment information associated with the scheduling of the communication session.

7. A method of claim 5, comprising:
causing, at least in part, a change to a time block representing availability of the plurality of time slots on the calendar user interface.

8. A method of claim 1, wherein the one or more ratings are part of the evaluation of the user for admission to an educational institution.

9. A method of claim1, comprising:
causing, at least in part, a presentation of a graphical user interface that includes,
a first section displaying the plurality of questions with a corresponding plurality of buttons, and a second section displaying a control bar with a plurality of tabs corresponding with the plurality of buttons.

10. A method of claim 1, comprising:
causing, at least in part, sharing of the one or more ratings among the one or more evaluators.

11. An apparatus comprising:
at least one processor; and
at least one memory including computer program code for one or more programs,
the at least one memory and the computer program code configured to, with the at least one processor, cause the apparatus to perform at least the following,
determine a plurality of segments of a communication session based on content of the communication session, wherein the communication session includes video media of an unscripted interview of a user who is to be evaluated, and the plurality of segments are identified based on a plurality of questions posed as part of the unscripted interview;
associate the plurality of segments with a recording of the communication session;
cause, at least in part, a presentation of the recording and a plurality of indicators for navigating playback of the recording based on the plurality of segments, wherein the plurality of indicators correspond to the plurality of questions; and
cause, at least in part, one or more ratings of one or more of the plurality of segments by one or more evaluators, the ratings being with respect to how the user replied to the corresponding questions.

12. An apparatus of claim 11, wherein the apparatus is further caused to:
determine an authorization of the one or more evaluators to rate the plurality of segments, the one or more evaluators participating in the evaluation of the user.

13. An apparatus of claim 11, wherein the apparatus is further caused to:
cause, at least in part, a transmission of the recording to cause a review of the plurality of segments.

14. An apparatus of claim 11, wherein the apparatus is further caused to:
associate the recording with an account associated with the user; and
cause, at least in part, an access to the recording based, at least in part, on an authentication of the user account.

15. An apparatus of claim 11, wherein the one or more ratings are part of the evaluation of the user for admission to an educational institution.

16. An apparatus of claim 11, wherein the apparatus is further caused to:
cause, at least in part, a presentation of a graphical user interface that includes,
a first section displaying the plurality of questions with a corresponding plurality of buttons, and a second section displaying a control bar with a plurality of tabs corresponding with the plurality of buttons.

17. An apparatus of claim 11, wherein the apparatus is further caused to:
cause, at least in part, sharing of the one or more ratings among the one or more evaluators.

18. A computer program product being stored on a non-transitory medium and including one or more sequences of one or more instructions which, when executed by one or more processors, cause the one of more processors to perform the following:
determine one of a plurality of segments of a communication session based on content of the communication session, wherein the communication session includes video media of an unscripted interview of a user who is to be evaluated, and the plurality of segments are identified based on a plurality of questions posed as part of the unscripted interview;
associate of the plurality of segment with a recording of the communication session;
cause, at least in part, a presentation of the recording and a plurality of indicators for navigating playback of the recording based on the plurality of segments, wherein the plurality of indicators correspond to the plurality of questions; and
cause, at least in part, one or more ratings of one or more of the plurality of segments by one or more evaluators, the ratings being with respect to how the user replied to the corresponding questions.

19. A computer program of claim 18, which, when executed by one or more processors, cause the one of more processors to perform the following:
determine an authorization of the one or more evaluators to rate the plurality of segments, the one or more evaluators participating in the evaluation of the user.

20. A computer program of claim 18, which, when executed by one or more processors, cause the one of more processors to perform the following:
cause, at least in part, a presentation of a graphical user interface that includes,
a first section displaying the plurality of questions with a corresponding plurality of buttons, and a second section displaying a control bar with a plurality of tabs corresponding with the plurality of buttons.

* * * * *